United States Patent
Lee

(10) Patent No.: US 10,713,531 B2
(45) Date of Patent: Jul. 14, 2020

(54) CONVOLUTION NEURAL NETWORK AND A NEURAL NETWORK SYSTEM HAVING THE SAME

(71) Applicant: SK hynix Inc., Icheon (KR)

(72) Inventor: Hyung-Dong Lee, Hwaseong-si (KR)

(73) Assignee: SK hynix Inc., Icheon-si (KR)

( * ) Notice: Subject to any disclaimer, the term of this patent is extended or adjusted under 35 U.S.C. 154(b) by 222 days.

(21) Appl. No.: 15/872,352

(22) Filed: Jan. 16, 2018

(65) Prior Publication Data

US 2018/0365520 A1 Dec. 20, 2018

(30) Foreign Application Priority Data

Jun. 14, 2017 (KR) .................. 10-2017-0074838

(51) Int. Cl.
*G06K 9/62* (2006.01)
*G06N 3/04* (2006.01)
*G06N 3/063* (2006.01)

(52) U.S. Cl.
CPC ........... *G06K 9/6256* (2013.01); *G06K 9/623* (2013.01); *G06N 3/04* (2013.01); *G06N 3/0454* (2013.01); *G06N 3/0635* (2013.01)

(58) Field of Classification Search
CPC .... G06K 9/6256; G06K 9/623; G06N 3/0635; G06N 3/0454; G06N 3/04; G06N 3/063
See application file for complete search history.

(56) References Cited

U.S. PATENT DOCUMENTS

| | | | | |
|---|---|---|---|---|
| 5,091,965 A | * | 2/1992 | Kobayashi | G06N 3/02 382/157 |
| 5,157,399 A | * | 10/1992 | Kobayashi | H03M 1/42 341/155 |
| 5,249,954 A | * | 10/1993 | Allen | F23N 5/082 431/14 |
| 5,283,746 A | * | 2/1994 | Cummings | G06N 3/063 700/104 |
| 5,422,982 A | * | 6/1995 | Pernisz | G06N 3/063 706/33 |
| 5,440,670 A | * | 8/1995 | Frazier | G06F 11/08 706/17 |
| 5,491,776 A | * | 2/1996 | Dangi | G06F 17/147 706/10 |
| 6,198,089 B1 | * | 3/2001 | Shi | G06K 9/00986 250/208.2 |
| 6,894,639 B1 | * | 5/2005 | Katz | G01S 7/417 342/159 |
| 7,359,888 B2 | * | 4/2008 | Snider | B82Y 10/00 706/26 |
| 9,014,416 B1 | | 4/2015 | Fisher et al. | |
| 9,345,413 B2 | * | 5/2016 | Schie | A61B 5/04017 |
| 10,074,050 B2 | * | 9/2018 | Kataeva | G06N 3/08 |
| 2003/0076992 A1 | * | 4/2003 | Banish | G06K 9/3233 382/156 |

(Continued)

*Primary Examiner* — Xuemei G Chen

(57) ABSTRACT

A neuromorphic device including a convolution neural network is described. The convolution neural network may include an input layer having a plurality of input pixels, a plurality of kernel resistors, each of the kernel resistors corresponding to one of the plurality of input pixels, and an intermediate layer having a plurality of intermediate pixels electrically connected to the plurality of kernel resistors.

10 Claims, 12 Drawing Sheets

(56) References Cited

U.S. PATENT DOCUMENTS

| | | |
|---|---|---|
| 2005/0089239 A1* | 4/2005 | Brajovic .................. G06T 5/50 |
| | | 382/266 |
| 2016/0019459 A1 | 1/2016 | Audhkhasi et al. |
| 2017/0011290 A1* | 1/2017 | Taha .................... G06N 3/0635 |
| 2017/0200078 A1* | 7/2017 | Bichler ................. G06N 3/049 |
| 2017/0293543 A1* | 10/2017 | Xu ....................... G06F 11/008 |
| 2017/0364791 A1* | 12/2017 | Miyashita ............... G06N 3/08 |
| 2018/0014748 A1* | 1/2018 | Choi .................... A61B 5/0536 |
| 2018/0018559 A1* | 1/2018 | Yakopcic ................. G06N 3/08 |
| 2018/0075338 A1* | 3/2018 | Gokmen ............. G06N 3/0635 |
| 2018/0075339 A1* | 3/2018 | Ma ......................... G06F 7/026 |
| 2018/0174025 A1* | 6/2018 | Jin ...................... G06N 3/0481 |
| 2018/0174030 A1* | 6/2018 | Hsu ......................... G06N 3/08 |
| 2018/0300618 A1* | 10/2018 | Obradovic ........ H01L 27/11273 |
| 2018/0357532 A1* | 12/2018 | Inoue .................. G06N 3/0635 |
| 2019/0122102 A1* | 4/2019 | Leobandung ........ G06N 3/0445 |
| 2019/0180174 A1* | 6/2019 | Koswatta ........... G06N 3/0635 |
| 2019/0392289 A1* | 12/2019 | Otsuka ................. G06F 7/5443 |
| 2020/0005151 A1* | 1/2020 | Jiang ................. G06K 9/00791 |

\* cited by examiner

CONVOLUTION NEURAL NETWORK AND A NEURAL NETWORK SYSTEM HAVING THE SAME

CROSS-REFERENCE TO RELATED APPLICATIONS

The present patent application claims priority under 35 U.S.C. § 119(a) to Korean Patent Application No. 10-2017-0074838, filed on Jun. 14, 2017, which is incorporated herein by reference in its entirety.

BACKGROUND

1. Field

The present disclosure relates to a neuromorphic device including a convolution neural network, a neural network system having the convolution neural network, and a neuromorphic device including the neural network system having the convolution neural network.

2. Description of the Related Art

Recently, much attention has been paid to devices in the field of neuromorphic technology, which use chips that mimic the human brain. A neuromorphic device based on the neuromorphic technology includes a plurality of pre-synaptic neurons or circuits, a plurality of post-synaptic neurons or circuits, and a plurality of synapses or synaptic circuits. The neuromorphic device outputs pulses or spikes having various levels, amplitude, and/or times, according to a learning state of the neuromorphic device.

The neuromorphic device includes a neural network system. The neural network system is implemented using Von-Neumann architecture.

When the neural network system using the Von-Neumann architecture calculates or processes data patterns, the neural network system accesses a memory device through a central processing unit, which delays processing time and requires heavy power consumption. The present disclosure provides a convolution neural network with a hardware configuration, a neural network system having the convolution neural network, and a neuromorphic device including the neural network system having the convolution neural network.

SUMMARY

An embodiment of the present disclosure provides a convolution neural network.

An embodiment of the present disclosure provides a neural network system having the convolution neural network.

An embodiment of the present disclosure provides a neuromorphic device including the neural network system having the convolution neural network.

An embodiment of the present disclosure provides a convolution neural network with a hardware configuration.

An embodiment of the present disclosure provides a convolution neural network that includes a filtering processor having a filtering resistor.

An embodiment of the present disclosure provides a convolution neural network that includes kernel resistors having fixed resistance values.

An embodiment of the present disclosure provides a neural network system that can compress data using a pooling processor.

The objectives of the present disclosure are not limited to the above-mentioned objectives and embodiments. Other objectives and embodiments may be understood by those skilled in the art in light of the present disclosure.

In an embodiment of the present disclosure, a neuromorphic device may include a convolution neural network. The convolution neural network may include an input layer having a plurality of input pixels, a plurality of kernel resistors having fixed resistance values, each of the kernel resistors corresponding to one of the plurality of input pixels, and an intermediate layer having a plurality of intermediate pixels electrically connected to the plurality of kernel resistors. The fixed resistance values may be pre-determined according to pattern data.

In an embodiment of the present disclosure, a neuromorphic device may include a convolution neural network. The convolution neural network may include an input device and an output device; and a plurality of convolution neural networks between the input device and the output device. Each of the plurality of convolution neural networks may include an input layer having a plurality of input pixels; a plurality of kernel resistors having fixed resistance values electrically connected to the plurality of input pixels; a plurality of intermediate pixels electrically connected to the plurality of kernel resistors; a plurality of pooling processors electrically connected to at least one of the plurality of intermediate pixels; and an output layer having an output pixel electrically connected to one of the plurality of pooling processors.

In an embodiment of the present disclosure, a neuromorphic device may include a convolution neural network. The convolution neural network may include a pattern sensing unit having a plurality of sensors; an input layer having a plurality of input pixels having data values; an intermediate layer having a plurality of intermediate pixels; an output layer having a plurality of output pixels; a filtering processor electrically connecting the plurality of sensors to the plurality of input pixels; and a convolution processor electrically connecting the plurality of input pixels to the plurality of intermediate pixels.

DETAILED DESCRIPTION

Figure 1A:
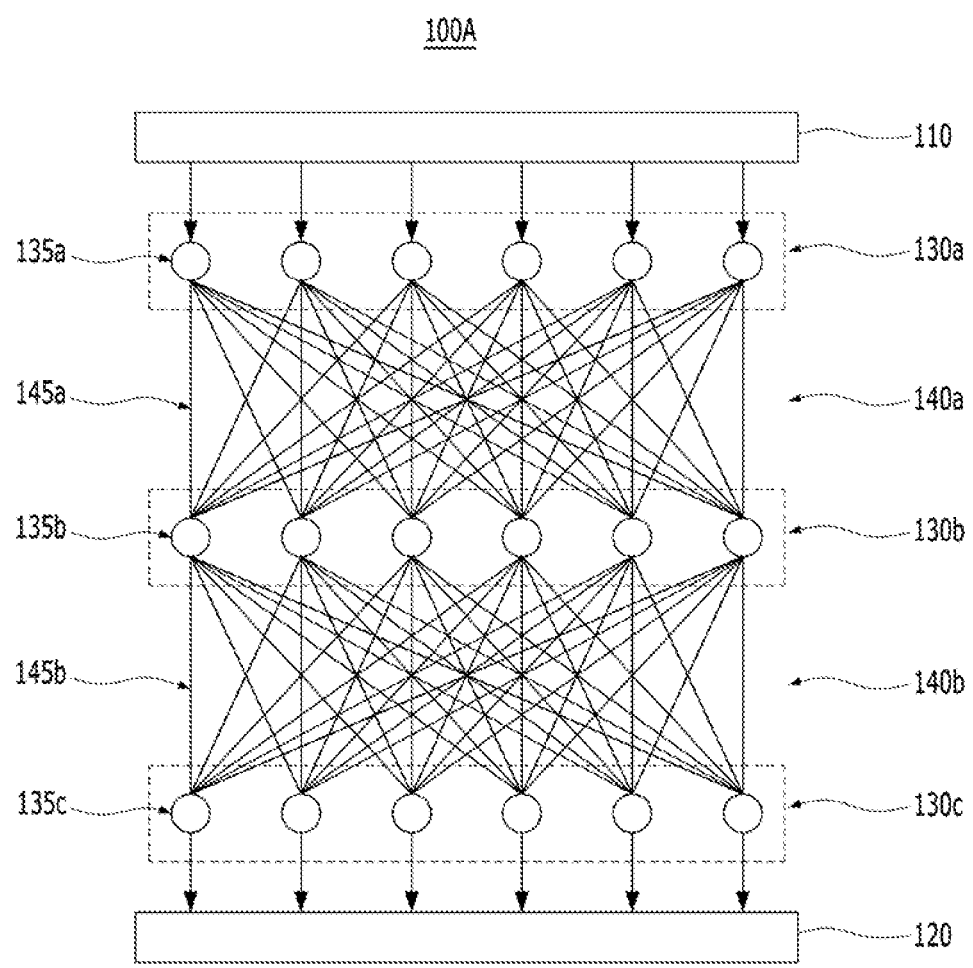
FIGS. 1A to 1C are diagrams schematically illustrating neural network systems of neuromorphic devices in accordance with embodiments of the present disclosure.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

Figure 1B:
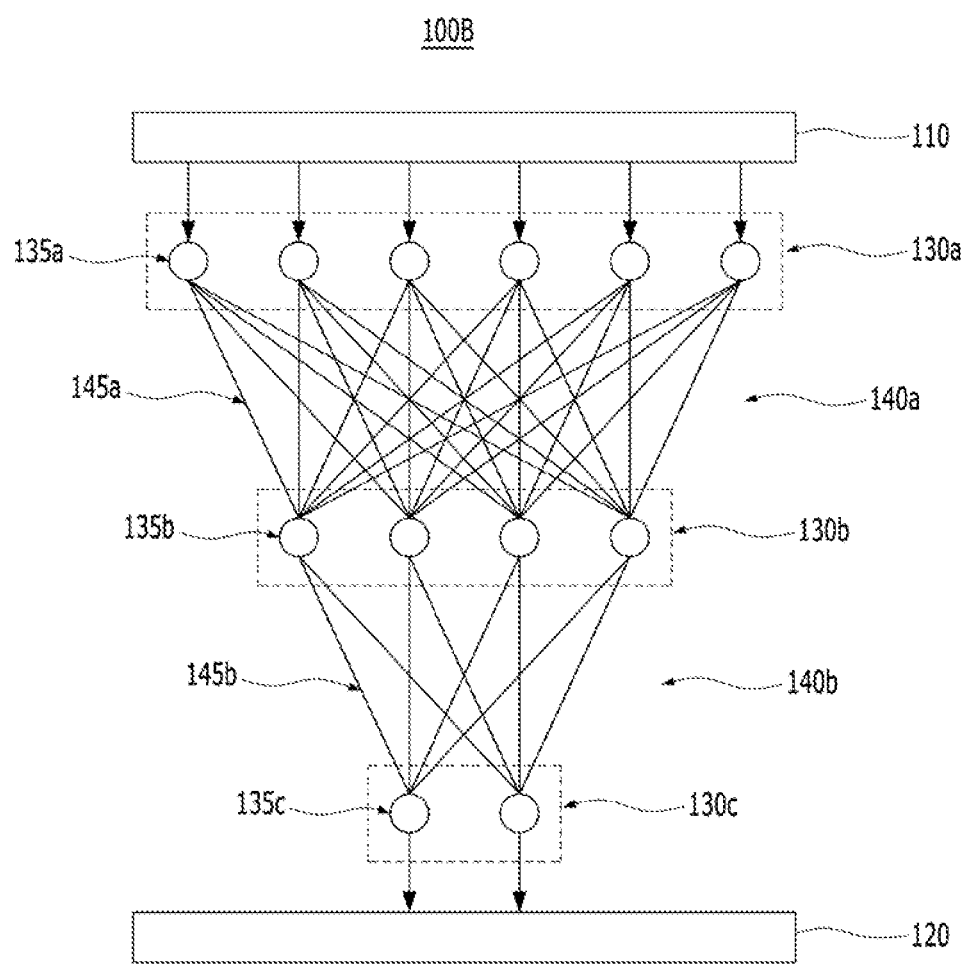
Figure 1C:
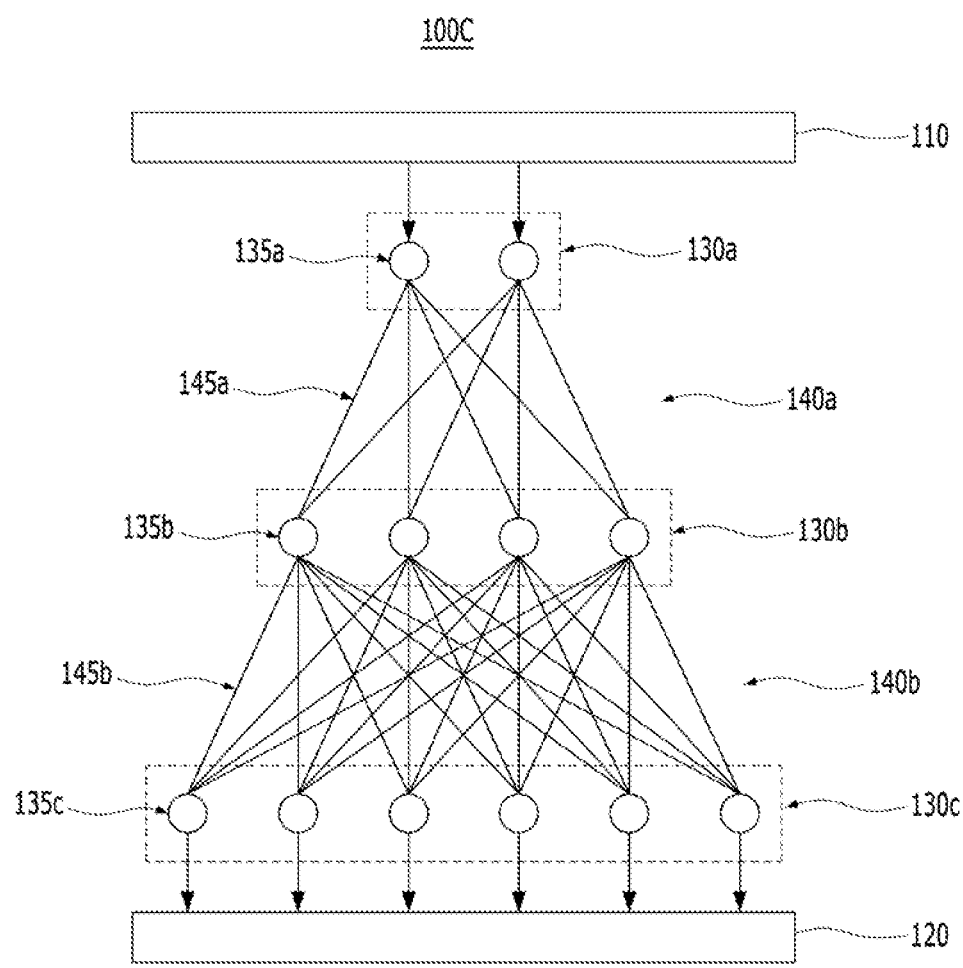

FIGS. 1A to 1C are diagrams schematically illustrating neural network systems 100A-100C of neuromorphic devices in accordance with embodiments of the present disclosure.

Referring to FIG. 1A, a neural network system 100A of a neuromorphic device in accordance with an embodiment of the present disclosure may include an input device 110, a plurality of neuron layers 130a to 130c, a plurality of synapse layers 140a and 140b, and an output device 120. The input device 110 may include a device such as a scanner, a camera, a microphone, or a sensor to sense various pattern data. The output device 120 may include a device such as a display, a printer, a speaker, or various video or audio devices. In some embodiments of the present disclosure, one of the input device 110 and the output device 120 may include a storage element that stores pattern data, such as a memory element. For example, a pattern data provided from the input device 110 to the first neuron layer 130a may be stored in the output device 120 or output by the output device 120.

The plurality of neuron layers 130a to 130c may include a plurality of neurons 135a to 135c, respectively. Although three neuron layers 130a to 130c and two synapse layers 140a and 140b are shown in FIG. 1A, in other embodiments, the neural network system 100A can include more neuron layers and more synapse layers. The neuron layers 130a to 130c may be connected to each other through the synapse layers 140a and 140b. Specifically, the first neurons 135a of the first neuron layer 130a may be connected to the second neurons 135b of the second neuron layer 130b through first synapses 145a. The second neurons 135b of the second neuron layer 130b may be connected to the third neurons 135c of the third neuron layer 130c through second synapses 145b.

Referring to FIG. 1B, a neural network system 100B of a neuromorphic device in accordance with an embodiment of the present disclosure may include a data compression network system. For example, the neural network system 100B may include an input device 110, a plurality of neuron layers 130a to 130c, a plurality of synapse layers 140a and 140b, and an output device 120. The number of neurons in neuron layers 130a to 130c and the number of synapses in synapse layers 140a and 140b may decrease from an upper portion (near or towards the input device 110) to a lower portion (near or towards the output device 120). For example, the neural network system 100B may include a compression convolution system and/or a compression pooling system.

Referring to FIG. 1C, a neural network system 100C of a neuromorphic device in accordance with an embodiment of the present disclosure may include a data expansion network system. For example, the neural network system 100C may include an input device 110, a plurality of neuron layers 130a to 130c, a plurality of synapse layers 140a and 140b, and an output device 120. The number of neurons in neuron layers 130a to 130c and the number of synapses in synapse layers 140a and 140b may increase from an upper portion (near or towards the input device 110) to a lower portion (near or towards the output device 120). For example, the neural network system 100B may include an expansion convolution system.

Figure 2:
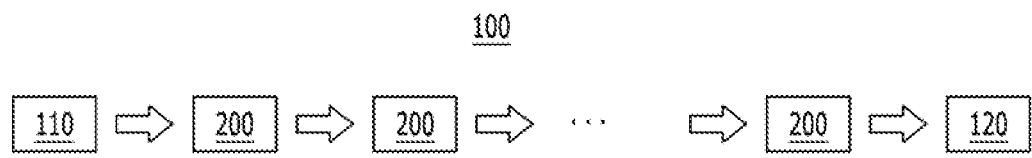
FIG. 2 is a diagram schematically illustrating a neural network system in accordance with an embodiment of the present disclosure.

FIG. 2 is a diagram schematically illustrating a neural network system in accordance with an embodiment of the present disclosure. Referring to FIG. 2, a neural network system 100 in accordance with an embodiment of the present disclosure may include an input device 110, a plurality of convolution neural networks 200, and an output device 120. The input device 110 may include a device such as a scanner, a camera, a microphone, or a sensor to sense various pattern data. The output device 120 may include a device such as a display, a printer, a speaker, or various video or audio devices. In some embodiments of the present disclosure, one of the input device 110 and the output device 120 may include a storage element that stores pattern data, such as a memory element. For example, a pattern data provided from the input device 110 to a convolution neural network 200 may be stored in the output device 120 or output by the output device 120. Alternatively, pattern data stored in the input device 110 may be provided to a convolution neural network 200 and output to the output device 120. The plurality of convolution neural networks 200 may convolution process the pattern data provided from the input device 110 and provide the processed pattern data to the output device 120. Referring again to FIGS. 1A to 1C, a convolution neural network 200 may correspond to neuron layers 130a to 130c and synapse layers 140a and 140b. A more detailed description will be described below.

Figure 3A:
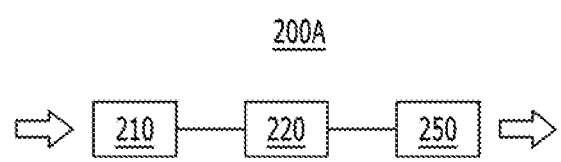
FIGS. 3A and 3B are diagrams schematically illustrating convolution neural networks in accordance with embodiments of the present disclosure.
Figure 3B:
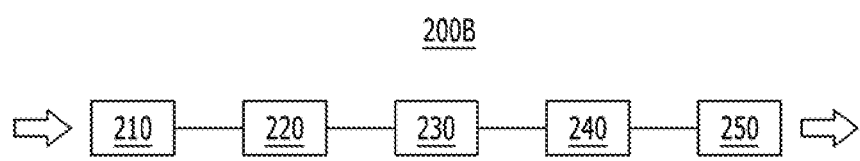

FIGS. 3A and 3B are diagrams schematically illustrating convolution neural networks in accordance with embodiments of the present disclosure. Referring to FIG. 3A, a convolution neural network 200A in accordance with an embodiment of the present disclosure may include an input layer 210, a convolution processor 220, and an output layer 250. The input layer 210 may include pattern data to be processed in the convolution processor 220. The input layer 210 may include the pattern data provided from an input device 110 or provided from a previous convolution neural network 200. For example, the input layer 210 includes an image pattern data. The convolution processor 220 may convolution process the image pattern data provided from the input layer 210 and provide the convolution processed image pattern data to the output layer 250. That is, the output layer 250 may include convolution processed image pattern data. The convolution processed image pattern data of the output layer 250 may be provided to another convolution neural network 200 or to an output device 120.

Referring to FIG. 3B, a convolution neural network 200B in accordance with an embodiment of the present disclosure may include an input layer 210, a convolution processor 220, an intermediate layer 230, a pooling processor 240, and an output layer 250. The convolution processor 220 may convolution process image pattern data provided from the input layer 210 and provide the convolution processed image pattern data to the intermediate layer 230. That is, the intermediate layer 230 may include the convolution processed image pattern data. The pooling processor 240 may pooling process the convolution processed image pattern data of the intermediate layer 230 and provide the pooling processed image data to the output layer 250. That is, the output layer 250 may include image pattern data that has been both convolution processed and pooling processed.

The convolution neural networks 200 shown in FIG. 2 may each include one of the convolution neural networks 200A or 200B shown in FIGS. 3A and 3B.

Figure 4A:
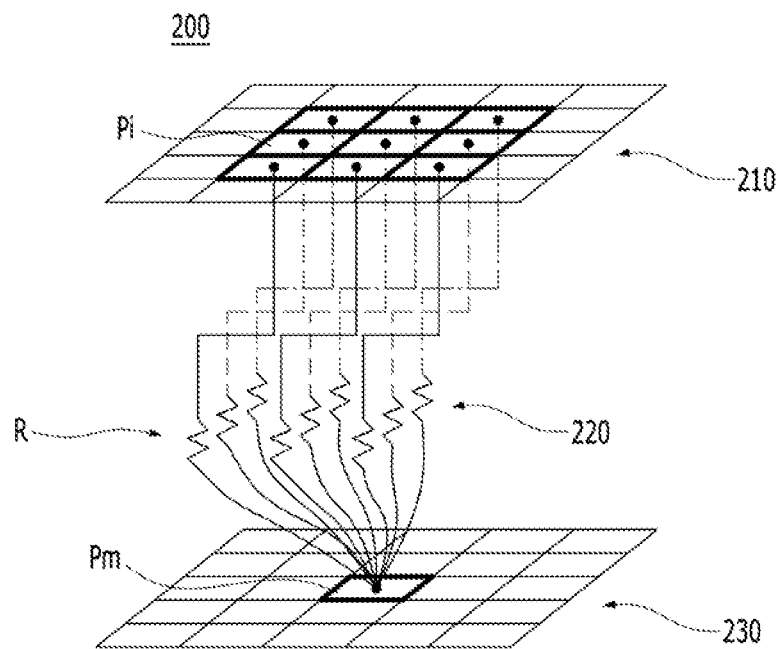
FIG. 4A is a diagram schematically illustrating a convolution processor of a convolution neural network
Figure 4B:
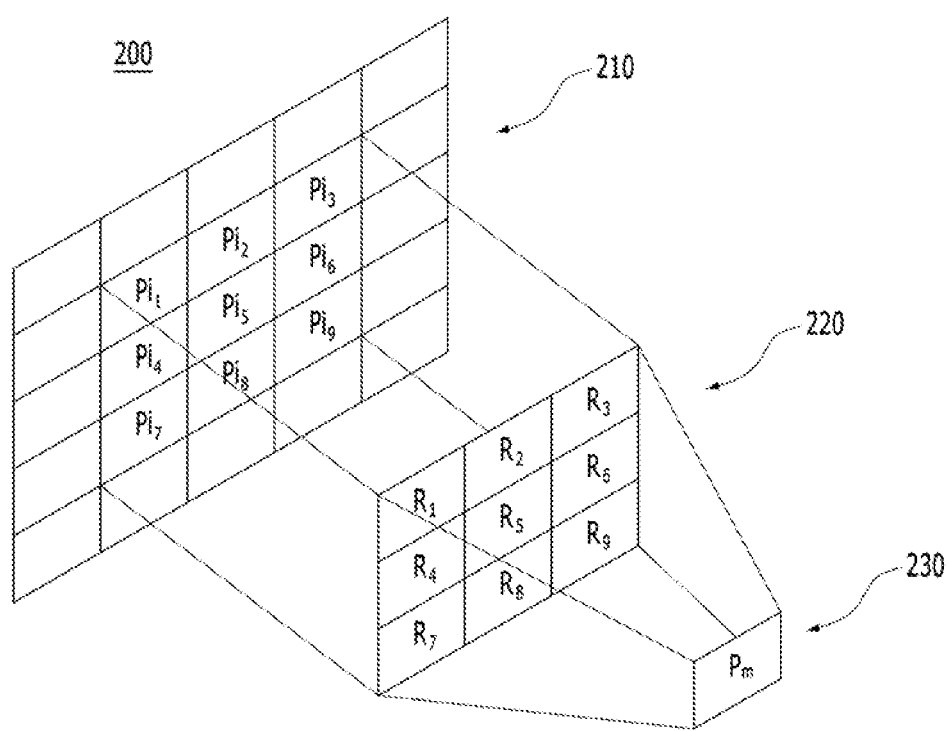
FIG. 4B is a diagram schematically describing a method of convolution processing using a convolution processor of a convolution neural network.

FIG. 4A is a diagram schematically illustrating a convolution processor 220 of a convolution neural network 200 in accordance with an embodiment of the present disclosure, and FIG. 4B is a diagram schematically describing a method of convolution processing using the convolution processor 220 of the convolution neural network 200. In an example, a method of convolution processing data values of 3×3 pixels Pi of an input layer 210 is described.

Referring to FIGS. 4A and 4B, a convolution neural network 200 in accordance with an embodiment of the present disclosure may include a convolution processor 220 between an input layer 210 and an intermediate layer 230. The convolution processor 220 may include a plurality of kernel resistors R electrically connected to and corresponding respectively with a plurality of input pixels Pi of the input layer 210. For example, each data value (e.g., synaptic weight) of nine pixels Pi1 to Pi9 of the input layer 210 is arithmetically operated (calculated) with respective kernel resistances R1 to R9 of the convolution processor 220, and the results transmitted to one pixel Pm of the intermediate layer 230. In other examples, a number N of grouped input pixels Pi may be electrically connected to one intermediate pixel Pm through a respective number N of grouped kernel resistors R, where N is a positive integer. In the embodiment illustrated in FIG. 4B, N is 9.

Thus, one intermediate pixel Pm of the intermediate layer 230 can be electrically connected to all of the grouped kernel resistors R1 to R9. Furthermore, one intermediate pixel Pm of the intermediate layer 230 may be electrically connected to all of the grouped input pixels Pi1 to Pi9 of the input layer 210. Referring again to FIG. 3A, in an embodiment of the present disclosure, the output layer 250 may be the intermediate layer 230. For example, the data values of the plurality of input pixels Pi1 to Pi9 of the input layer 210 may be synaptic weights (i.e., current values), and the data values can be used in the calculation below and the result transmitted to one pixel Pm of the intermediate layer 230.

$$Pm = (Pi1/R1 + Pi2/R2 + Pi3/R3 + Pi4/R4 + Pi5/R5 + Pi6/R6 + Pi7/R7 + Pi8/R8 + Pi9/R9)$$

This equation is presented as an example.

According to the present disclosure, the plurality of pixels Pi of the input layer 210 may be calculated in a variety of ways with the kernel resistors R of the convolution processor 220, and the result transmitted to one pixel Pm of the intermediate layer 230. Furthermore, the data values of a central pixel (for example, pixel Pi5 in FIG. 4B) in the center of the input layer 210 and peripheral pixels (for example, pixels Pi1 to Pi4 and Pi6 to Pi9 in FIG. 4B) can be convolution processed and concentrated in one pixel (e.g., pixel Pm in FIG. 4B) of intermediate layer 230. That is, the convolution processing of the convolution neural network 220 may be performed on all input pixels of the input layer 210. Although the convolution processing has been described as performed on 3×3 pixels PiX of the input layer 210, convolution processing can be performed on M×M (where M is odd number) pixels PiX (such as 5×5, 7×7, 9×9, and etc.).

In an embodiment, the kernel resistors RX may include resistive devices having fixed resistance values pre-determined according to various types of image pattern data in an input layer 210. Specifically, a convolution processor 220 may have fixed kernel resistance values so that fast operations can be performed according to the various types of the image pattern data. Accordingly, the convolution processor 220 of the convolution neural network 200 according to the present disclosure can perform convolution processing using a hardware configuration, so that the processing speed of the convolution processor 220 is faster than processing speeds using software.

In another embodiment, the kernel resistors RX may have variable resistors. For example, the kernel resistors RX may have one of a phase change random access memory (PCRAM), a resistive random access memory (ReRAM), a magneto-resistive random access memory (MRAM), a conductive bridging random access memory (CBRAM), or other variable resistive elements.

Figure 5A:
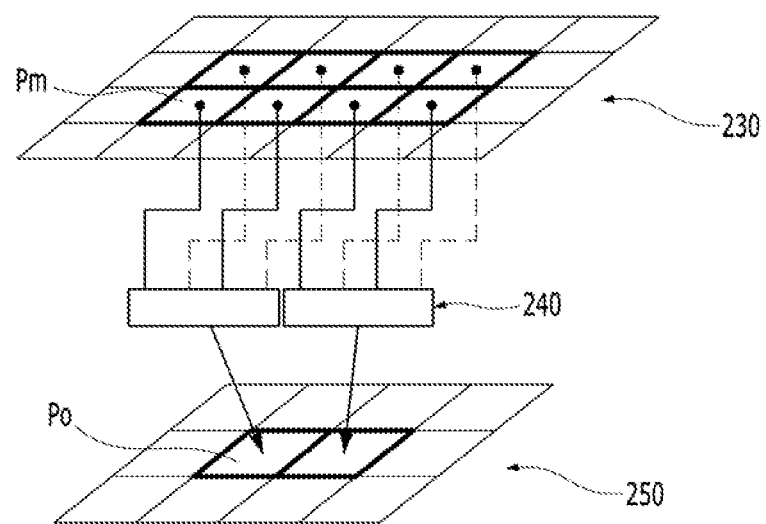
FIGS. 5A and 5B are schematic diagrams illustrating a pooling processor and a pooling processing method of a convolution neural network in accordance with an embodiment of the present disclosure.
Figure 5B:
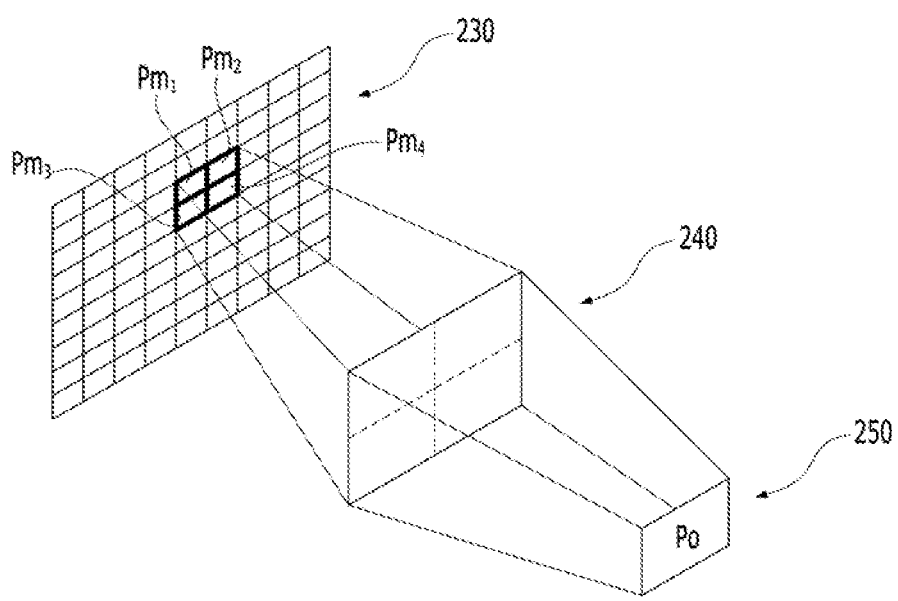

FIGS. 5A and 5B are schematic diagrams illustrating a pooling processor 240 and describing a pooling processing method of a convolution neural network 200 in accordance with an embodiment of the present disclosure. To facilitate understanding of the present disclosure, in an example, a method of pooling processing data values of 2×2 intermediate pixels Pm is described.

Referring FIGS. 5A and 5B, a convolution neural network 200 in accordance with an embodiment of the present disclosure may include a pooling processor 240 between an intermediate layer 230 and an output layer 250. In FIG. 5B, the pooling processor 240 may calculate the values of a plurality of pixels Pm1 to Pm4 of the intermediate layer 230 and transmit the calculated values to one pixel Po of the output layer 250. For example, the pooling processor 240 may include a filter matrix having at least one of resistors, capacitors, diodes, or transistors electrically connected to each of the pixels Pm1 to Pm4 of the intermediate layer 230. The output or pooling processor 240 may calculate the voltage or current applied to each unit filters (resistors, capacitors, diodes, or transistors) of the filter matrix in various methods to determine the final output value.

In the embodiments of the present disclosure, the pooling processor 240 may include at least one of a maximum pooling processor, a minimum pooling processor, and an averaging pooling processor. The maximum pooling processor may select the maximum value among the values of the plurality of pixels Pm1 to Pm4 of the intermediate layer 230 and transmit (or output) the maximum value to one pixel Po of the output layer 250. The minimum pooling processor may select the minimum value among the values of the plurality of pixels Pm1 to Pm4 of the intermediate layer 230 and transmit (or output) the minimum value to one pixel Po of the output layer 250. The averaging pooling processor may average the values of the plurality of pixels Pm1 to Pm4 of the layer 230 and transmit (or output) the averaged value to one pixel Po of the output layer 250. In other embodiments of the present disclosure, the pooling processor 240 may include various pooling processors to perform various calculating operations.

For example, the pooling processor 240 can be a maximum pooling processor. That is, the pooling processor 240 of the present embodiment can transmit the maximum value among the grouped intermediate pixels Pm1 to Pm4 of the intermediate layer 230 to one pixel Po of the output layer 250. Because the values of the grouped intermediate pixels Pm1 to PmX of the plurality of intermediate layers 230 can be transmitted to one output pixel Po of the output layer 250, the image pattern data can be compressed (where X is a positive integer, and in an embodiment, X is 4).

Figure 6A:
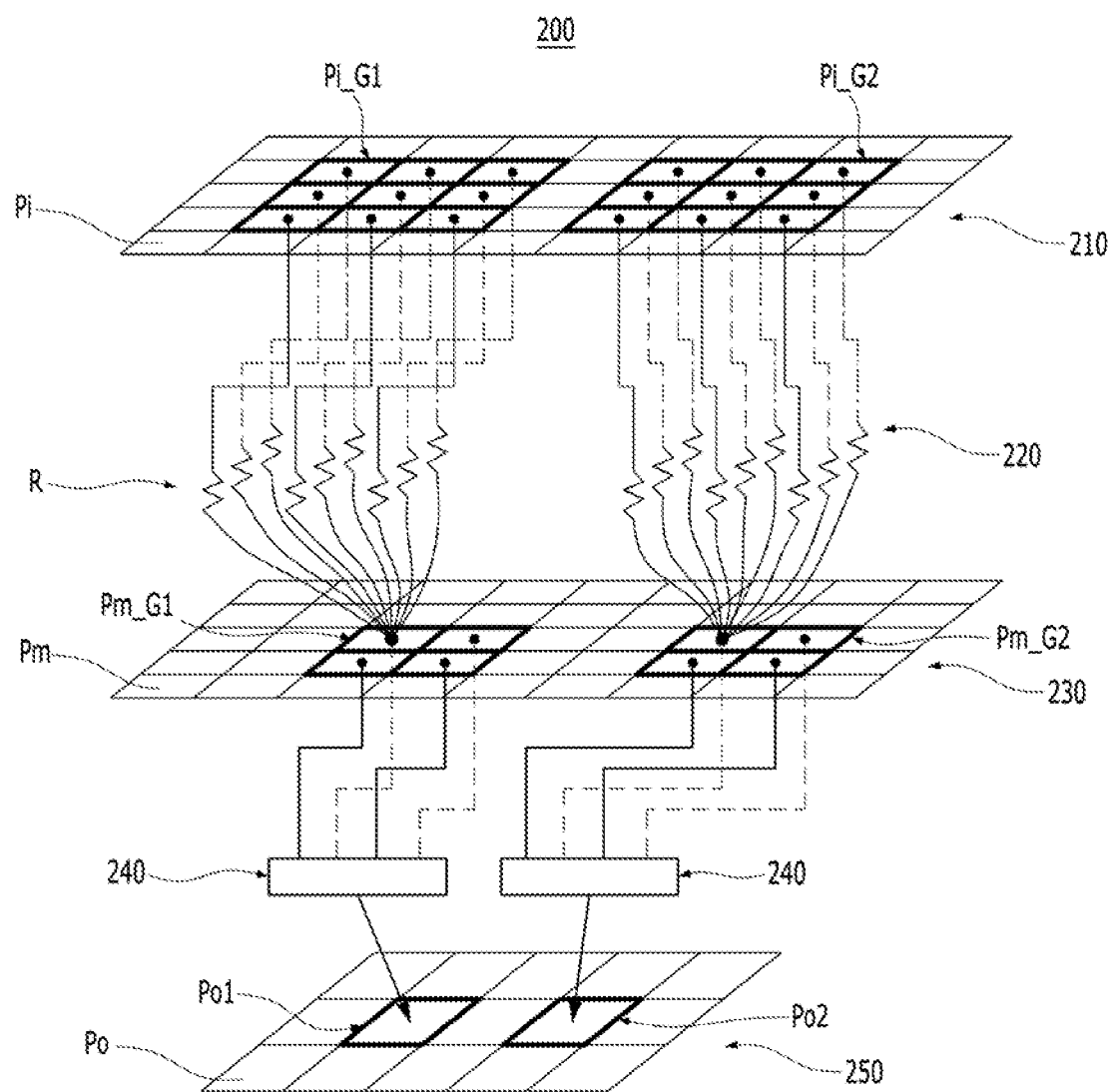
FIGS. 6A and 6B are schematic diagrams illustrating a convolution neural network in accordance with an embodiment of the present disclosure.
Figure 6B:
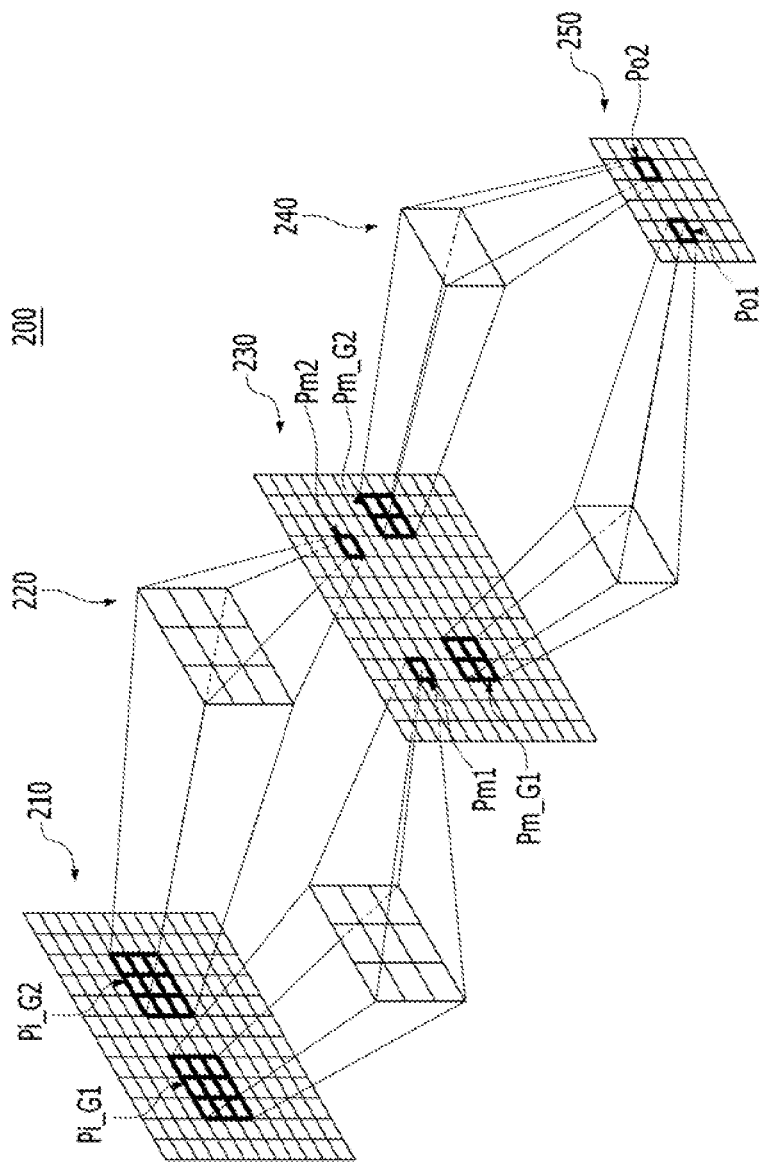

FIGS. 6A and 6B are schematic diagrams illustrating a convolution neural network 200 in accordance with an embodiment of the present disclosure. Referring to FIGS. 6A and 6B, a convolution neural network 200 in accordance with an embodiment of the present disclosure may include an input layer 210, a convolution processor 220, an intermediate layer 230, a pooling processor 240, and an output layer 250. To facilitate understanding of the present disclosure, in an example, two groups of 3×3 input pixels Pi are convolution processed as input pixel groups Pi_G1 and Pi_G2, respectively, and two groups of 2×2 intermediate pixels Pm are pooling processed as intermediate pixel groups Pm_G1 and Pm_G2, respectively.

Referring to FIG. 6A, in a convolution neural network 200 in accordance with an embodiment of the present disclosure, input pixel groups Pi_G1 and Pi_G2 of an input layer 210 may be convolution processed and the results transmitted to one of the intermediate pixels Pm in corresponding intermediate pixel groups Pm_G1 and Pm_G2, respectively. In FIG. 6B, data patterns of input pixel groups Pi_G1 and Pi_G2 of an input layer 210 may be convolution processed and the results transmitted to intermediate pixels Pmt and Pmt. Referring to FIGS. 6A and 6B, the values of the intermediate pixel groups Pm_G1 and Pm_G2 may be pooling processed and the results transmitted respectively to the output pixels Pot and Pot of the output layer 250. The number of the input pixels Pi of the input layer 210 and the number of the intermediate pixels Pm of the intermediate layer 230 may be substantially equal. That is, during the convolution processing, the central input pixel Pi of the input pixel group Pi_Gx of the input layer 210 may correspond to the one intermediate pixel Pm of the intermediate layer 230 in a one-to-one correspondence. The number of the output pixels Po of the output layer 250 may be less than the number of the intermediate pixels Pm of the intermediate layer 230. That is, during the pooling processing, a plurality of intermediate pixels Pm of the intermediate layer 230 may correspond to one of the output pixels Po of the output layer 250.

Further referring to FIGS. 1A-1C, the input layer 210 may correspond to the first neuron layer 130*a*, the convolution processor 220 may correspond to the first synapse layer 140*a*, the intermediate layer 230 may correspond to the second neuron layer 130*b*, the pooling processor 240 may correspond to the second synapse layer 140*b*, and the output layer 250 may correspond to the third neuron layer 130*c*. Thus, neurons 135*a*, 135*b* and 135*c* may correspond to input or output pixels, synapses 145*a* may correspond to kernel resistors, and synapses 145*b* may correspond to a filter matrices each having at least one of resistors, capacitors, diodes, or transistors. In some embodiments of the present disclosure, two neuron layers 130*a* and 130*b* and the synapse layer 140*a*, or two neuron layers 130*b* and 130*c* and the synapse layer 140*b*, may correspond to a single convolution neural network 200.

The neuromorphic network system 100 and the convolution neural network 200 of a neuromorphic device in accordance with various embodiments of the present disclosure may be very advantageous when used to recognize specific image pattern data. Specifically, when learning or recognizing various image patterns having a specific type, data can be processed quickly without any feed-back using the convolution processor 220 and the pooling processor 240 that have been already set up or pre-set.

For example, when learning or recognizing image patterns having a specific shape, neurons (pixels) necessary for learning or recognition and unnecessary neurons (pixels) can be known in advance, kernel resistors having relatively low resistance values can be connected to the necessary neurons (pixels), and kernel resistors having relatively high resistance values can be connected to the unnecessary neurons (pixels). Accordingly, the data values of the necessary neurons (pixels) can be maintained or amplified, and the data values of the unnecessary neurons (pixels) can be removed or reduced. That is, the kernel resistors may correspond to synaptic weights of neuromorphic devices.

Figure 7A:
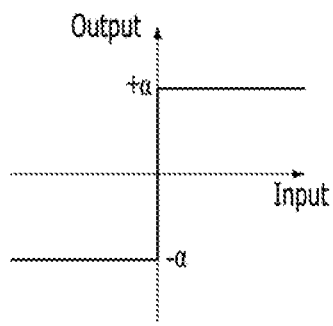
FIGS. 7A to 7C are graphs schematically illustrating characteristics of neurons in accordance with various embodiments of the present disclosure.
Figure 7B:
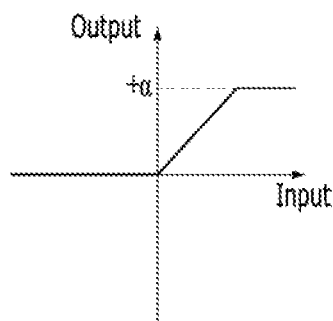
Figure 7C:
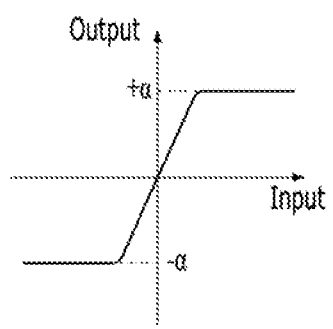

FIGS. 7A to 7C are graphs schematically illustrating characteristics of neurons in accordance with various embodiments of the present disclosure. Referring to FIG. 7A, a neuron such as 135*a*, 135*b*, or 135*c* in FIGS. 1A to 1C, in accordance with an embodiment of the present disclosure may have a hard limiter functional output characteristic. For example, when the input signal is a negative (−) value, it is possible to output an output signal having a constant negative value (−α), and when the input signal is a positive (+) value, it is possible to output an output signal having a constant positive value (+α).

Referring to FIG. 7B, a neuron such as 135*a*, 135*b*, or 135*c* in FIGS. 1A to 1C, in accordance with an embodiment of the present disclosure may have a threshold logic functional output characteristic. For example, when the input signal is a negative (−) value, the output signal can be zero, and when the input signal is a positive (+) value, the output signal can have a positive (+) value proportional to the input signal value until the output signal reaches a limited value (+α).

Referring to FIG. 7C, a neuron such as 135*a*, 135*b*, or 135*c* in FIGS. 1A to 1C, in accordance with an embodiment of the present disclosure may have a sigmoid functional output characteristic. For example, when the input signal changes from a negative (−) value to a positive (+) value, the output signal may smoothly transition from a negative (−) value to a positive (+) value. The output signal may have a limited negative (−α) value and a limited positive (+α) value, respectively.

Figure 8:
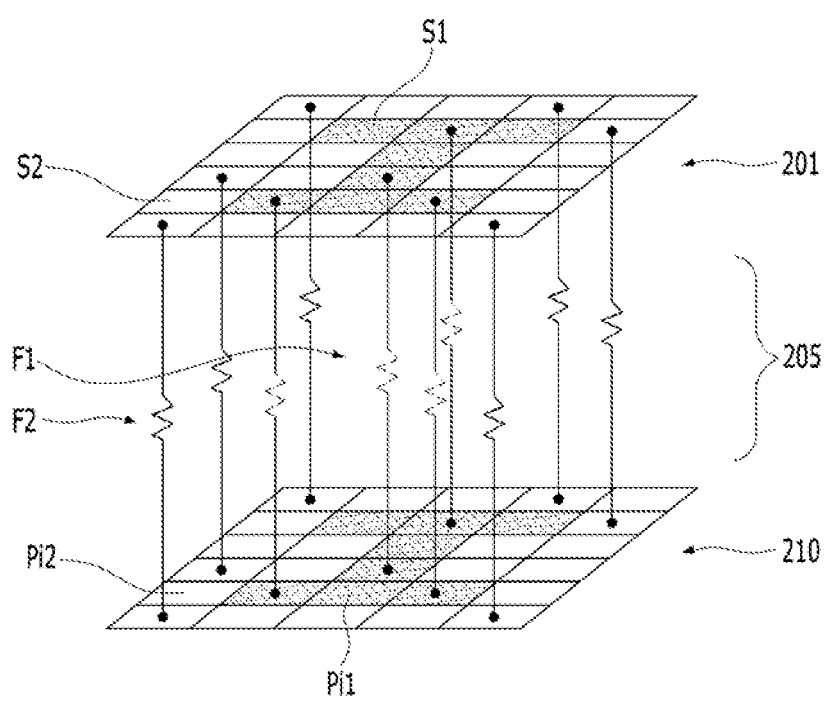
FIG. 8 is a diagram schematically illustrating a portion of a neural network of a neuromorphic device in accordance with an embodiment of the present disclosure.

FIG. 8 is a diagram schematically illustrating a portion of a neural network system of a neuromorphic device in accordance with an embodiment of the present disclosure. Referring to FIG. 8, a neural network system of a neuromorphic device in accordance with an embodiment of the present disclosure may further include a filtering processor 205 between a pattern sensing unit 201 and an input layer 210.

The pattern sensing unit 201 may include first sensors S1 and second sensors S2. The first sensors S1 can sense effective pattern data, and the second sensors S2 can sense ineffective pattern data. For example, as shown in FIG. 8, when an image pattern similar to the character "H" is sensed in the pattern sensing unit 201, the pattern sensing unit 201 may generate a first sensing signal having an effective data information corresponding to the character "H" and a second sensing signal from second sensors S2 having ineffective data information not corresponding to the character "H".

The filtering processor 205 may include first filter resistors F1 and second filter resistors F2. The first filter resistors F1 may be connected to the first sensors S1 having effective data information and the second filter resistors F2 may be connected to the second sensors S2 having ineffective data information. The first filter resistors F1 are indicated by dashed lines, and the second filter resistors F2 are indicated by solid lines in FIG. 8. In the present disclosure, the first filter resistors F1 may have relatively low fixed resistance values, and the second filter resistors F2 may have relatively high fixed resistance values.

The input layer 210 may include first input pixels Pi1 and second input pixels Pi2. For example, the first input pixels Pi1 may be coupled to the first sensors S1 through the first filter resistors F1, and the second input pixels Pi2 may be coupled to the second sensors S2 through the second filter resistors F2.

Accordingly, a first information of the first sensors S1 sensed by the pattern sensing unit 201 may be transmitted to the first input pixels Pi1 of the input layer 210 through the first filter resistors F1 of the filtering processor 205, and a second information sensed by the second sensors S2 may be transmitted to the second input pixels Pi2 of the input layer 210 through the second filter resistors F2 of the filtering processor 205. The first information may include effective pattern data and the second information may include ineffective pattern data. The first filter resistors F1 may have relatively low resistance values, and the second filter resistors F2 may have relatively high resistance values. That is, the filtering processor 205 may perform a filtering operation by processing the first information of the first sensors S1 as effective signals and the second information of the second sensors S2 as noise. The filtering processor 205 can transmit the first effective information (effective pattern data) to the first input pixels Pi1 of the input layer 210, and block or reduce the second information (ineffective pattern data) transmitted to the second input pixels Pi2.

When the neuromorphic device according to an embodiment of the present disclosure is used for a specific purpose, pattern data specialized for the purpose may be transmitted to the input layer 210. Ineffective information or any invalid pattern data of some sensors (for example, second sensors S2) can be skipped, so that power consumption can be reduced and data processing speed can be increased.

In embodiments, when the first filter resistors F1 and the second filter resistors F2 have fixed resistance values, only the data pattern corresponding to the predetermined first sensors S1 or second sensors S2 selectively applied to the input pixels Pi1 or Pi2 of the input layer 210. In other embodiments, when the first filter resistors F1 and the second filter resistors F2 have variable resistance values, the resistance values of the first filter resistors F1 and the second filter resistors F2 can be set according to various purposes. That is, the filtering processor 205 can transmit pattern data having various field shapes to the input layer 210 according to various purposes.

Figure 9:
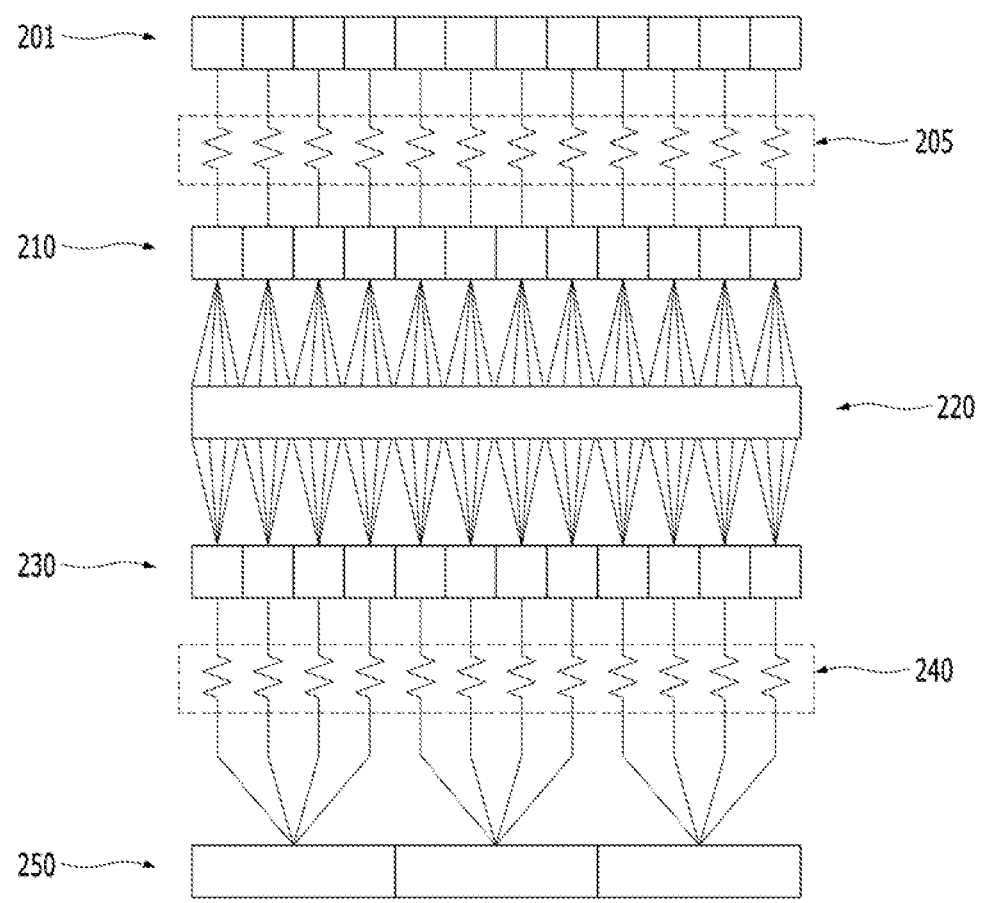
FIG. 9 is a diagram schematically illustrating a neural network system in accordance with an embodiment of the present disclosure.

FIG. 9 is a diagram schematically illustrating a neural network system in accordance with an embodiment of the present disclosure. Referring to FIG. 9, a neural network system in accordance with an embodiment of the present disclosure may include a pattern sensing unit 201, a filtering processor 205, an input layer 210, a convolution neural network 220, an intermediate layer 230, a pooling processing unit 240, and an output layer 250. Specifically, pattern data sensed by the pattern sensing unit 201 may be filtered by the filtering processor 205 and transmitted to the input layer 210. As described with reference to FIG. 8, the input layer 210 may include the first input pixels Pi1 with effective information (or valid pattern data) and the second input pixels Pi2 with ineffective information (or invalid pattern data). In the convolution neural network 220, the effective pattern data of the first input pixels Pi1 may be convolution processed and the ineffective pattern data of the second input pixels Pi2 may be substantially skipped or ignored. Accordingly, the power consumption of the neural network system in accordance with an embodiment of the present disclosure can be further reduced, and the data processing speed can be further increased.

Figure 10:
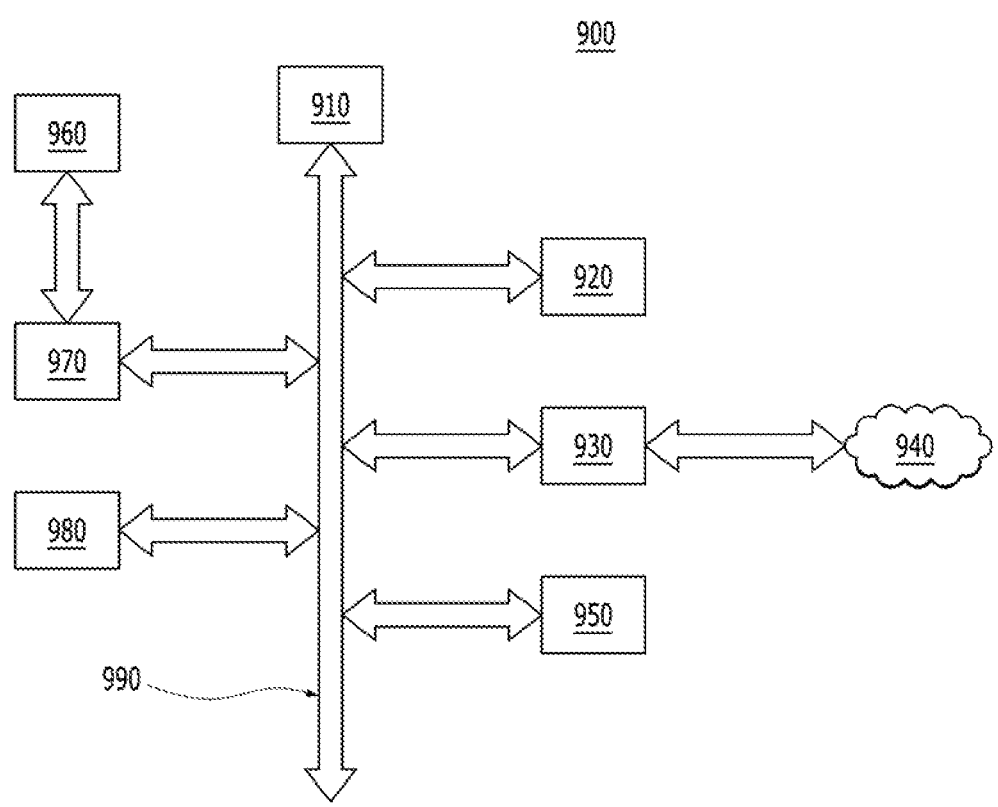
FIG. 10 is a diagram schematically illustrating a pattern recognition system in accordance with an embodiment of the present disclosure.

FIG. 10 is a diagram schematically illustrating a pattern recognition system 900 in accordance with an embodiment of the present disclosure. For example, the pattern recognition system 900 may include a speech recognition system, an imaging recognition system, a code recognition system, a signal recognition system, and one or more systems for recognizing various patterns.

Referring to FIG. 10, the pattern recognition system 900 in accordance with the embodiment of the present disclosure may include a Central Processing Unit (CPU) 910, a memory unit 920, a communication control unit 930, a network 940, an output unit 950, an input unit 960, an Analog-Digital Converter (ADC) 970, a neuromorphic unit 980, and/or a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing speech and imaging patterns based on an output from the neuromorphic unit 980.

The CPU 910 may be connected to the memory unit 920, the communication control unit 930, the output unit 950, the ADC 970, and the neuromorphic unit 980 through the bus 990.

The memory unit 920 may store various pieces of information, which are required to be stored in the pattern recognition system 900. The memory unit 920 may include one or more of a volatile memory device, such as DRAM or SRAM, a nonvolatile memory, such as PRAM, MRAM, ReRAM or NAND flash memory, and various memory units, such as Hard Disk Drive (HDD) and Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include a speaker, a printer, a monitor, a display panel, a beam projector, a hologrammer, or other various output devices. The output unit 950 may output, for example, speech and/or image recognition data.

The input unit 960 may include any of a microphone, a camera, a scanner, a touch pad, a keyboard, a mouse, a mouse pen, and one or more of various sensors.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

The neural network system and the neuromorphic device in accordance with the present disclosure can calculate at a very high speed and have a low power consumption.

The neural network system and the neuromorphic device in accordance with the present disclosure can have a simpler system configuration than a conventional neural network and a conventional neuromorphic system.

The neural network systems and the neuromorphic device in accordance with the present disclosure can be specialized for specific data patterns. Kernel resistors and/or filter resistors may have fixed resistance values that correspond to specific data patterns, which allow for faster processing.

Although various embodiments have been described for illustrative purposes, it will be apparent to those skilled in the art that various changes and modifications may be made without departing from the spirit and scope of the disclosure, as defined in the following claims.

What is claimed is:

1. A neuromorphic device including a convolution neural network comprising:
    a convolution neural network comprising
        an input layer having a plurality of input pixels;
        a plurality of kernel resistors having fixed resistance values, each of the kernel resistors corresponding to one of the plurality of input pixels;
        an intermediate layer having a plurality of intermediate pixels electrically connected to the plurality of kernel resistors,
        a pattern sensing unit having a plurality of sensors; and
        a filtering processor having a plurality of filter resistors electrically connecting the plurality of sensors to the plurality of input pixels,
        wherein the fixed resistance values are pre-determined according to pattern data,
        wherein the filtering processor comprises a plurality of filter resistors having fixed resistance values,
        wherein each of the plurality of filter resistors electrically connects one of the plurality of sensors to one of the plurality of input pixels,
        wherein the plurality of the sensors comprises a plurality of first sensors having effective information and a plurality of second sensors having ineffective information,
        wherein the plurality of filter resistors comprises a plurality of first filter resistors electrically connected to the plurality of first sensors and a plurality of second filter resistors electrically connected to the plurality of second sensors, and
        wherein the plurality of first filter resistors have resistance values lower than resistance values of the plurality of second filter resistors.

2. The neuromorphic device of claim 1, wherein each of the plurality of kernel resistors is electrically connected to one of the plurality of input pixels and one of the plurality of intermediate pixels.

3. The neuromorphic device of claim 2, wherein at least N of the input pixels are commonly electrically connected to one of the intermediate pixels through N of the kernel resistors, where N is a positive integer.

4. The neuromorphic device of claim 1, further comprising
    at least one pooling processor electrically connected to the plurality of intermediate pixels, and
    an output layer having a plurality of output pixels,
    wherein one of the plurality of output pixels is electrically connected to the at least one pooling processor.

5. The neuromorphic device of claim 4, wherein at least M of the intermediate pixels are commonly electrically connected to one of the output pixels, where M is a positive integer.

6. The neuromorphic device of claim 4, wherein the at least one pooling processor transmits a maximum value or an average value of data values of the M of the intermediate pixels to the one of the output pixels.

7. The neuromorphic device of claim 4, wherein the plurality of output pixels has fewer pixels than the plurality of intermediate pixels.

8. A neuromorphic device including a convolution neural network comprising:
    a pattern sensing unit having a plurality of sensors;
    an input layer having a plurality of input pixels having data values;
    an intermediate layer having a plurality of intermediate pixels;
    an output layer having a plurality of output pixels;
    a filtering processor electrically connecting the plurality of sensors to the plurality of input pixels; and
    a convolution processor electrically connecting the plurality of input pixels to the plurality of intermediate pixels,
    wherein the filtering processor comprises a plurality of filter resistors having fixed resistance values,
    wherein each of the plurality of filter resistors electrically connects one of the plurality of sensors to one of the plurality of input pixels,
    wherein the plurality of the sensors comprises a plurality of first sensors having effective information and a plurality of second sensors having ineffective information,
    wherein the plurality of filter resistors comprises a plurality of first filter resistors electrically connected to the plurality of first sensors and a plurality of second filter resistors electrically connected to the plurality of second sensors, and
    wherein the plurality of first filter resistors have resistance values lower than resistance values of the plurality of second filter resistors.

9. The neuromorphic device of claim 8, wherein the convolution processor comprises kernel resistors having fixed resistance values,
    wherein the convolution processor processes data values of the plurality of input pixels and transmits the processed data values to one of the plurality of intermediate pixels.

10. The neuromorphic device of claim 8, further comprising:
    a pooling processor electrically connecting the plurality of intermediate pixels to one of the plurality of output pixels,
    wherein the pooling processor transmits an averaged value of data values of the plurality of intermediate pixels to the one of the plurality of output pixels.

* * * * *